United States Patent
Kim et al.

(10) Patent No.: US 11,221,753 B2
(45) Date of Patent: Jan. 11, 2022

(54) METHOD FOR ADAPTIVELY SWITCHING GRAPHIC USER INTERFACES AND MOBILE DEVICE FOR PERFORMING THE SAME

(71) Applicant: NHN CORPORATION, Gyeonggi-do (KR)

(72) Inventors: Ji Hye Kim, Gyeonggi-do (KR); Dong Woo Kim, Gyeonggi-do (KR); Han Na Lee, Gyeonggi-do (KR); Yeon Seong Chae, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/872,373

(22) Filed: May 12, 2020

(65) Prior Publication Data
US 2020/0363944 A1 Nov. 19, 2020

(30) Foreign Application Priority Data
May 13, 2019 (KR) .................. 10-2019-0055392

(51) Int. Cl.
G06F 3/0488 (2013.01)
G06F 3/01 (2006.01)
G06F 3/0482 (2013.01)

(52) U.S. Cl.
CPC ......... *G06F 3/04883* (2013.01); *G06F 3/017* (2013.01); *G06F 3/0482* (2013.01); *G06F 2203/04808* (2013.01)

(58) Field of Classification Search
None
See application file for complete search history.

(56) References Cited

U.S. PATENT DOCUMENTS 9,639,250 B2 * 5/2017 Xu .............. G06F 3/04883
2004/0125150 A1 7/2004 Adcock et al.
(Continued)

FOREIGN PATENT DOCUMENTS

JP 2012-178167 9/2012
JP 2017-224310 12/2017
(Continued)

OTHER PUBLICATIONS

Office Action dated Apr. 13, 2021 for Japanese Patent Application No. 2020-083932 and its English translation from Global Dossier.

*Primary Examiner* — Amare Mengistu
*Assistant Examiner* — Sarvesh J Nadkarni
(74) *Attorney, Agent, or Firm* — Ladas & Parry, LLP

(57) ABSTRACT

A mobile communication terminal includes an image capturing device obtaining image contents, an image content storage device storing the image contents obtained by the image capturing device, a display device including a touch panel through which a user input is received, and displaying the image contents, and an image contents viewer controller. The image contents viewer controller is configured to generate and display a first image content viewer interface listing thumbnails and/or information of the image contents based on an acquisition time of each of the image contents, receive an interface switching user touch gesture input from an user on the first image content viewer interface, and in response to the interface switching user touch gesture, switch the first image content viewer interface to a period-specific image content viewer interface in which the plurality of image contents are grouped and provided according to a grouping period.

14 Claims, 11 Drawing Sheets

(56) References Cited

U.S. PATENT DOCUMENTS

| | | | | |
|---|---|---|---|---|
| 2014/0068478 A1* | 3/2014 | Won | ..................... | G06F 3/0488 |
| | | | | 715/765 |
| 2015/0331560 A1* | 11/2015 | Song | .................. | G06F 3/04842 |
| | | | | 715/765 |
| 2016/0110046 A1* | 4/2016 | Yao | ..................... | G06F 3/0488 |
| | | | | 715/784 |
| 2018/0084198 A1* | 3/2018 | Kumar | ................. | G06F 3/0482 |

FOREIGN PATENT DOCUMENTS

| | | |
|---|---|---|
| KR | 10-2005-0047488 | 5/2005 |
| KR | 10-2015-0133045 | 11/2015 |

* cited by examiner

METHOD FOR ADAPTIVELY SWITCHING GRAPHIC USER INTERFACES AND MOBILE DEVICE FOR PERFORMING THE SAME

CROSS REFERENCE TO RELATED APPLICATION

This application claims priority from and the benefits of Korean Patent Application No. 10-2019-0055392, filed on May 13, 2019, which are hereby incorporated by reference for all purposes as if fully set forth herein.

BACKGROUND

Technical Field

The present disclosure generally relates to a mobile communication terminal providing an user interface for image content management and a method for image content management using the same. More specifically, some exemplary embodiments of the present disclosure relate to a mobile communication terminal providing an user interface for an image content viewer grouping image contents using metadata thereof and providing an interface for a layered image content viewer, and a computerized image content management method using the same.

Discussion of the Background

Mobile communication terminals, such as smart phones, which have been widely used in recent years, support various functions in addition to sending and receiving voice calls and text messages through a mobile phone network.

In particular, it is common that the mobile communication terminal has an image capturing device capable of capturing high resolution image contents. The user of the mobile communication terminal may take pictures or videos using the built-in imaging device, store the taken pictures and videos, or share them with other mobile communication terminals through a communication platform such as social media. In addition, by using an image capture application embedded in the mobile communication terminal, the image content displayed on the mobile communication terminal may be captured, or image content transmitted from another mobile communication or a server may be downloaded and stored.

Hereinafter, storing image content captured by the mobile communication terminal, captured, or transmitted from another mobile communication or a server is referred to as 'acquisition' of the image content.

Due to the wide spread of mobile communication terminals and media sharing platforms such as social media, the amount of image content acquired is increasing. However, the conventional image content viewers embedded in the mobile communication terminal simply provide the image contents according to the acquisition time, which is inconvenient when searching for the image contents. In particular, when the image content that the user wants to see is acquired in the far distant past, it takes a considerable time for the user to search the image content back and forth.

The above information disclosed in this Background section is only for enhancement of understanding of the background of the inventive concept, and, therefore, it may contain information that does not form the prior art that is already known in this country to a person of ordinary skill in the art.

SUMMARY

Some exemplary embodiments may provide a mobile device configured to magnify a graphic user interface according to the relative inclination of the mobile device with respect to the user's gaze. Certain exemplary embodiments may also provide a method for magnifying a graphic user interface according to the relative inclination of the mobile device with respect to the user's gaze.

Additional aspects will be set forth in the detailed description which follows, and, in part, will be apparent from the disclosure, or may be learned by practice of the inventive concept.

Various exemplary embodiments may provide a mobile communication terminal including an imaging device obtaining image contents, an image content storage device storing the image contents obtained by the imaging unit, a display device including a touch panel through which a user input is received, and displaying the image contents, and an image contents viewer controller. The image contents viewer controller is configured to generate and display a first image content viewer interface listing thumbnails of image contents based on an acquisition time of each of the image contents, receive an interface switching user touch gesture input on the first image content viewer interface, and in response to the interface switching user touch gesture, switch the first image content viewer interface to a period-specific image content viewer interface in which the plurality of image contents are grouped and provided according to a grouping period.

The interface switch user touch gesture may be a gesture of changing a distance between two touched points (hereinafter, referred to as "touch interval") while a user touches any two points on the first image content viewer interface.

The period-specific image content viewer interface may be provided by a plurality of stages, each of which has different lengths of the grouping period.

The image content viewer controller may be configured to increase the grouping period when the touch interval is increased, and to decrease the grouping period when the touch interval is decreased.

The image content viewer controller bay be further configured to detect a change of a touch interval of the interface switching user touch gesture, determine the grouping period according to the detected change of the touch interval, group the plurality of image contents according to the determined grouping period based on the image content acquisition time included in the metadata of the plurality of image contents, and generate an period-specific image content viewer interface displaying image contents classified according to the grouping period.

Alternatively, the image content viewer controller is further configured to count a number of inputs of the interface switching user touch gesture, determine the grouping period according to the detected number of the inputs of the interface switching user touch gesture, group the plurality of image contents according to the determined grouping period based on the image content acquisition time included in the metadata of the plurality of image contents, and generate an period-specific image content viewer interface displaying image contents classified according to the grouping period.

The image content viewer controller may be configured to suspend interface switching until the input of the interface switching user touch gesture is completed, and determine the grouping period based on the touch interval when the input is completed.

The grouping period includes day, week and month, and the period-specific image content viewer interface includes a daily image content viewer interface, a weekly image content viewer interface, and a monthly image content viewer interface according to the grouping period.

The weekly image content viewer interface and the monthly image content viewer interface include a calendar display area and an image content display area.

Various exemplary embodiments may provide a method for managing image contents, which is performed by an image content viewer controller embedded in a mobile communication terminal, comprising generating and displaying a first image content viewer interface listing thumbnails of image contents based on an acquisition time of each of the image contents, receiving an interface switching user touch gesture input on the first image content viewer interface, and in response to the interface switching user touch gesture, switching the first image content viewer interface to a period-specific image content viewer interface in which the plurality of image contents are grouped and provided according to a grouping period.

According to some exemplary embodiments of the present disclosure, period-specific image content viewer interfaces can be efficiently switched by an user's touch input without including a graphical user interface for sort, such as a button, in the period-specific image content viewer interface, and therefore the graphic configuration of the period-specific image content viewer interface may be simplified, necessary system resource may be reduced and operation efficiency may be increased. The metadata of the acquired image can be technically widely used. For example, the metadata may be associated or used with other relevant services and can be provided for source of big data.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
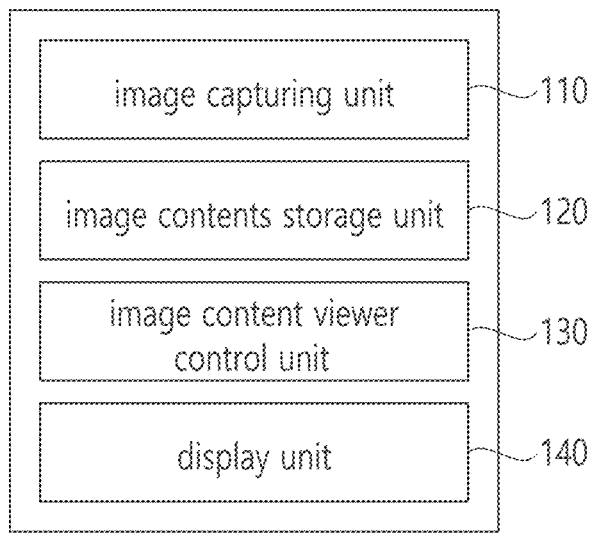
FIG. 1 is a block diagram conceptually illustrating a configuration of a mobile communication terminal according to an embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and apparatus are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to." or "directly coupled to" another element or layer, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the"

are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram conceptually illustrating a configuration of a mobile communication terminal according to an embodiment of the present disclosure.

Referring to FIG. 1, the mobile communication terminal 10 may include an image capturing unit 110, an image content storage unit 120, an image content viewer control unit 130, and a display unit 140.

The display unit 140 may be configured to display on a display. The display unit 140 may be one or more devices that enable a user to interact with the mobile communication terminal 10. The display unit 140 may provide Input/Output (I/O) interfaces. For example, the display unit 140 may include a touch panel configured to receive a user's touch input.

The image capturing unit 110 may include an optical device, for example, a device having as a lens and an imaging device such as a charge-coupled device (CCD). The image capturing unit 110 may be configured to perform a function of capturing or photographing an external view to generate image content. For instance, the imaging unit 110 may be mounted on a mobile communication terminal in the form of a camera module. A smartphone includes a from camera disposed on a from surface to which a display is mounted and a rear camera disposed on a rear surface of the smart phone.

The image content storage unit 120 may be configured to store image contents captured by the image capturing unit 110, for example, a picture or a video. The image content storage unit 120 may be configured as part of a memory built in the mobile communication terminal 10. As described above, the image content storage unit 120 may store captured or downloaded image contents in addition to the image contents captured by the image capturing unit 110.

In the present disclosure, the term "acquisition" of an image content may refer to all operations of storing the image content in the image content storage unit 120 such as taking photographs or videos, capturing displayed images, and downloading the image content.

The image content viewer controller 130 may be configured to control an image content viewer configured to provide image contents stored in the image content storage unit 120 to the user through the display 140. For example, the image content viewer controller 130 generates and provides (or displays) a first image content viewer interface listing thumbnails of image contents according to an acquisition time, and receives an user's input (e.g. an user's touch gesture for switching an interface) through the first image content viewer interface, and in response to the user's input, switches the first image content viewer interface to a period-specific image content viewer interface in which a plurality of image contents are grouped and provided according to the grouping period.

In this example, the user's touch gesture for switching the interface (or an interface switching user touch gesture) may be, for instance, but not limited to, a gesture that increases or decreases the distance between two touched points while the user touches any two points on the first image content viewer interface. The period-specific image content viewer interface may be provided by being divided into a plurality of steps each of which has different lengths of the grouping period.

For example, the period-specific image content viewer interface may be provided differently for each grouping period having different lengths such as daily, weekly, and monthly.

When the period-specific image content viewer interface is provided differently according to the grouping period, the image content viewer controller 130 may be configured to determine the grouping period based on the received user's touch gesture for switching the interface, and to generate and provide (or display) a period-specific image content viewer interface corresponding to the determined grouping period.

According to some embodiments of the present disclosure, period-specific image content viewer interfaces can be efficiently switched by an user's touch input without including a graphical user interface for sort, such as a button, in the period-specific image content viewer interface, and therefore the graphic configuration of the period-specific image content viewer interface may be simplified, necessary system resource may be reduced and operation efficiency may be increased.

The image content viewer controller 130 may refer to a hardware based unit, a software based unit or a combination of hardware and software. The hardware based unit may include self-contained components such as chipsets, specialized circuitry and one or more memory devices, while the software-based unit may be part of a program code or linked to the program code containing specific programmed instructions, which may be loaded in memory. The image content viewer controller 130 (whether hardware, software, or a combination thereof) may be designed to implement or execute one or more particular functions or routines. For example, the image content viewer controller 130 may be implemented as a processor.

Hereinafter, the operations of the image content viewer controller 130 will be described in detail with reference to FIGS. 2 to 7.

Figure 2:
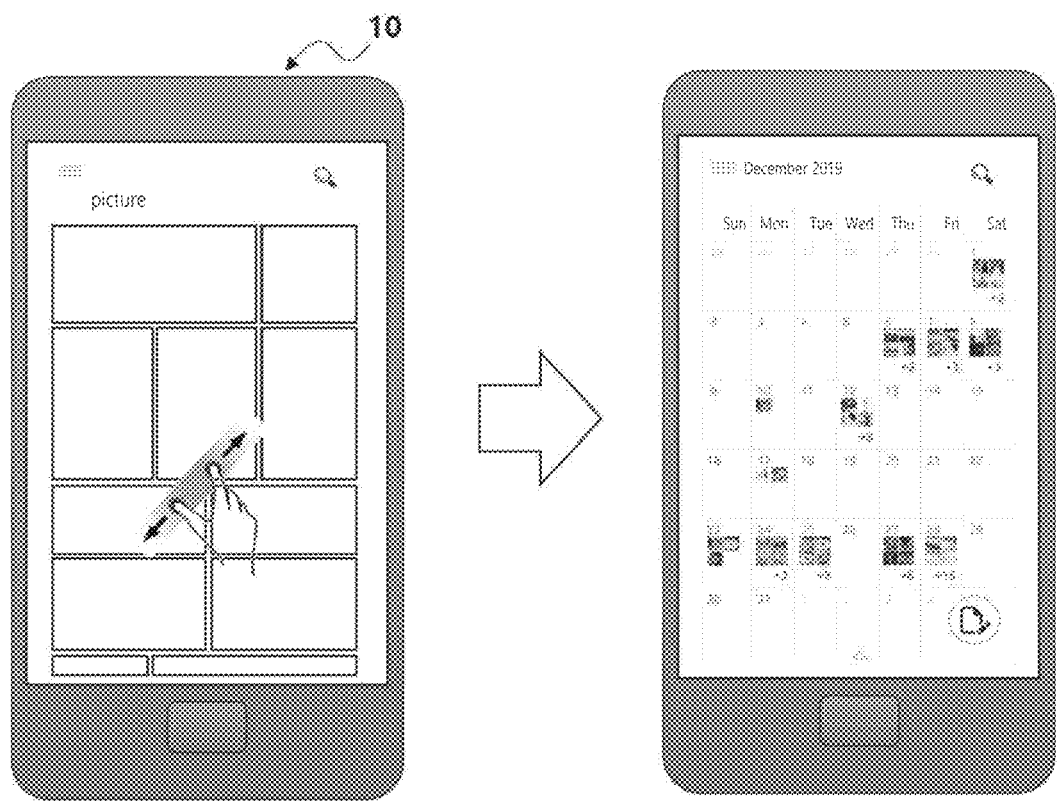
FIG. 2 is a diagram illustrating an example of switching a first image content viewer interface into a period-specific image content viewer interface according to a user's input for switching interfaces according to an embodiment of the present disclosure.

FIG. 2 is a diagram illustrating an example of switching a first image content viewer interface into a period-specific image content viewer interface according to an input of an interface switching user touch gesture.

The first image content viewer interface may be a user interface displaying a plurality of image contents. For example, the first image content view may be a user interface in which a plurality of image contents stored in the image content storage unit 120 are arranged in a specific order, for example, but not limited to, a descending or ascending order according to the image content acquisition time. The arrangement of the image content of the first image content viewer interface may be changed according to a user's selection or setting.

The user may input a request for switching the first image content viewer interface to a period-specific image content viewer through the first image connect view interface provided on the display 140. One example of the request for switching the first image content viewer interface to a period-specific image content viewer is an interface switching user touch gesture. The interface switching user touch gesture may be a user's input of touching any two points on the first image content viewer interface and changing the distance between the two points, for example, the increment of a distance between the two touched points as shown in FIG. 2.

The interface switching user touch gesture may be modified in various forms. The interface switching user touch gesture may be preset by a manufacturer or set or changed by a user.

For example, the period-specific image content viewer interface may be provided with an icon, interface or button for increasing the grouping period ("period increasing button") and an icon, interface or button for decreasing the grouping period ("period decreasing button"). In this example, when the user touches the period increasing button displayed in the period-specific image content viewer interface, the image content viewer controller 130 may switch the currently displayed period-specific image content viewer interface to a period-specific image content viewer interface having a longer grouping period than the currently displayed period-specific image content viewer interface. For example, when the display 140 of the mobile communication terminal 10 is displaying the weekly image content viewer interface and the user touches the period increasing button, the image content viewer controller 130 may switch the weekly image content viewer interface to the monthly image content viewer interface, which is a longer grouping period. Conversely, when the display 140 of the mobile communication terminal 10 is displaying the weekly image content viewer interface and the user touches the period decreasing button, the image content viewer controller 130 may switch he weekly image content viewer interface to the daily image content viewer interface, which is a shorter grouping period. As such, when a separate interface (such as a button) for increasing or decreasing the grouping period is provided, the grouping period may be determined or changed according to the number of touches of the button. For example, a single touch on the period increasing button displayed on the daily image content viewer interface causes to switch to the weekly image content viewer interface corresponding to the next grouping period, and a double touch on the period increasing button causes to switch to the monthly image content viewer interface.

The interface switching user touch gesture is not limited to the above, and may be modified in various forms.

The touch panel of the display unit 140 may be configured to receive the interface switching user touch gesture and to output a signal associated with the interface switching user touch gesture to the image content viewer controller 130. The image content viewer controller 130 may be configured to receives the signal associated with the interface switch user touch gesture, and to generate a period-specific image content viewer interface and displays it on the display 140 in response to the signal associated with the interface switch user touch gesture.

As described above, the period-specific image content viewer interface may be provided differently for each grouping period having different time period lengths such as daily, weekly, and monthly.

Exemplary embodiments of the image content viewer for each period will be described in detail with reference to FIGS. 3 to 7.

Figure 3:
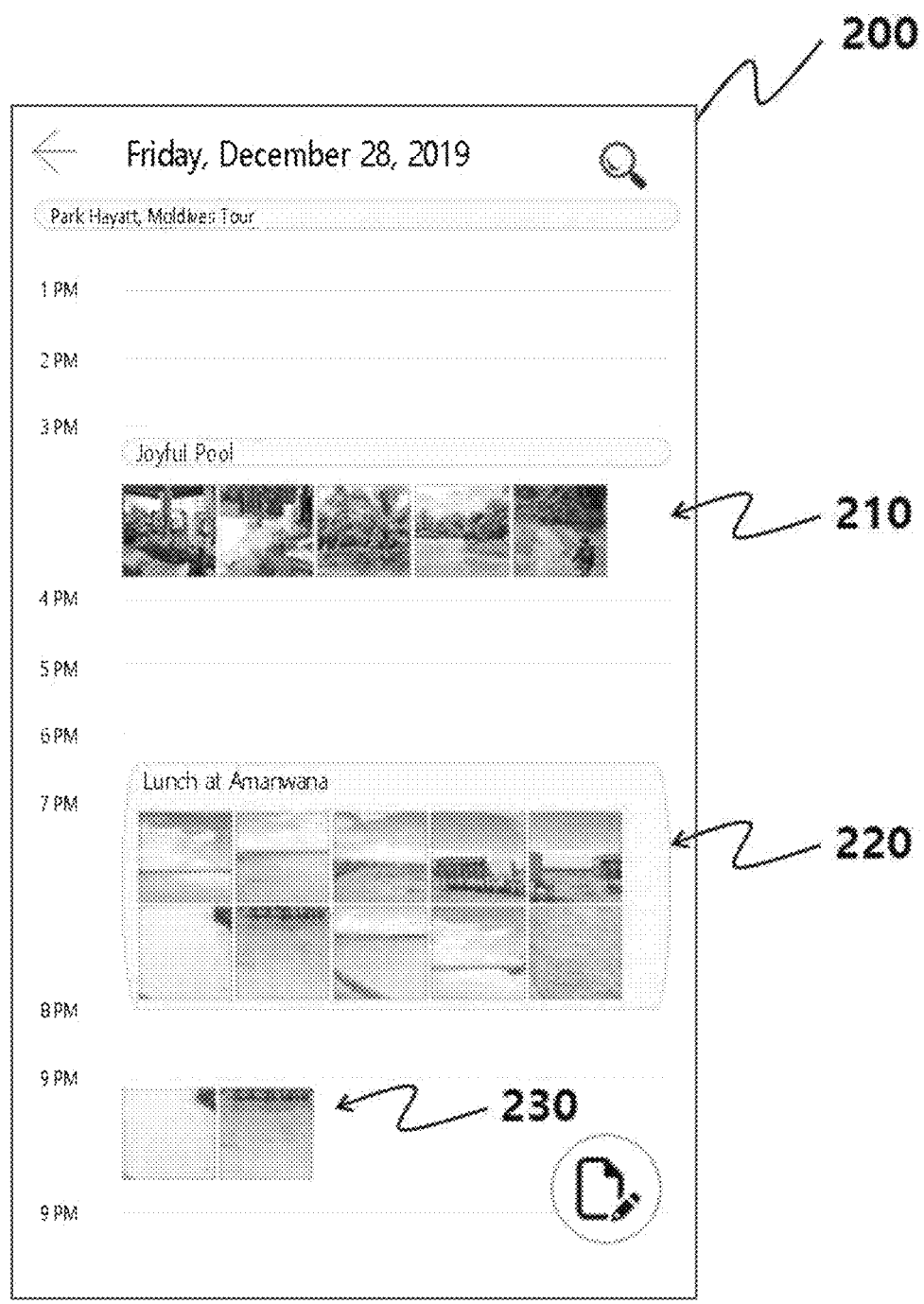
FIG. 3 is a screenshot illustrating an example of an interface of a daily image content viewer according to an embodiment of the present disclosure.
Figure 4:
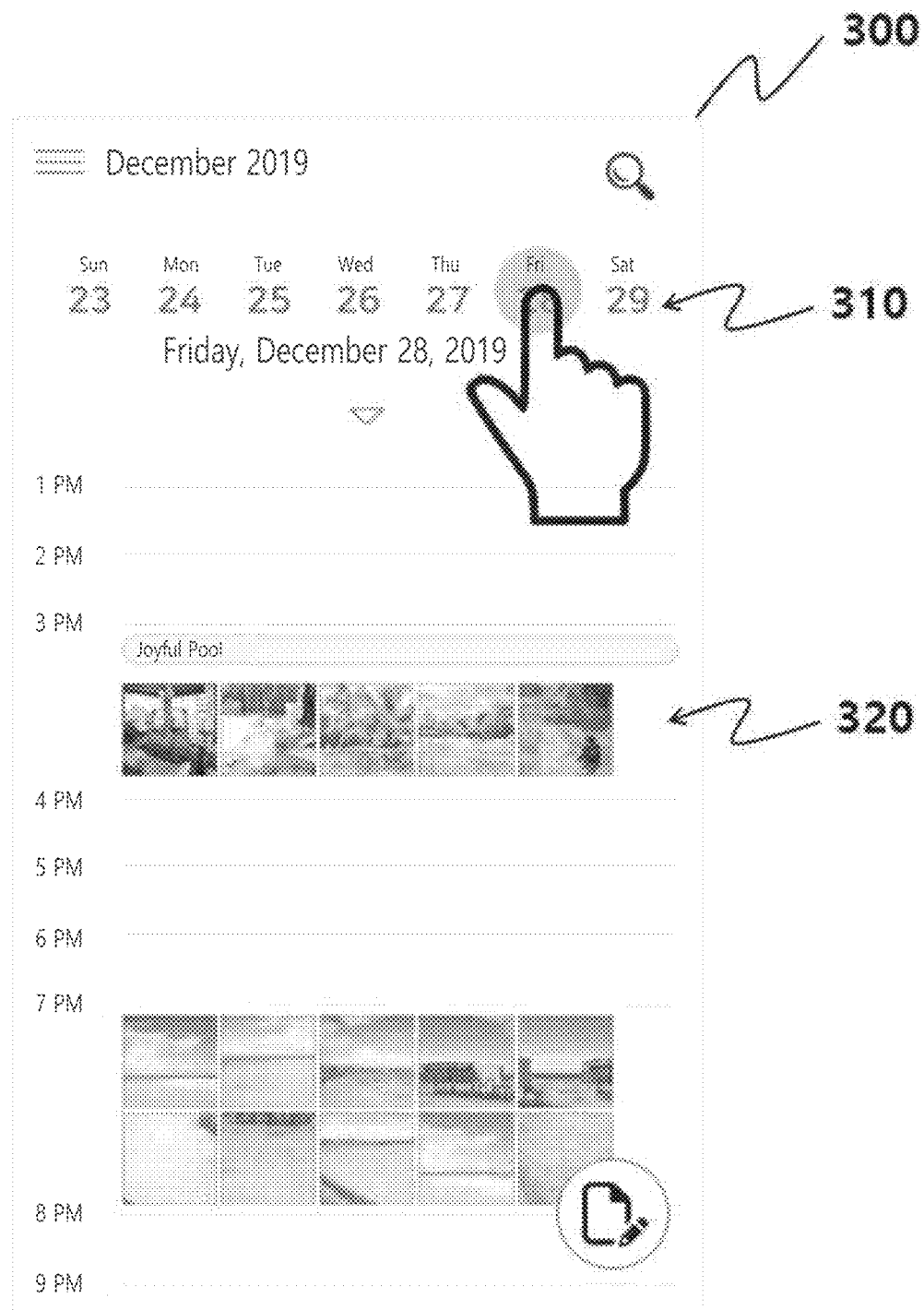
FIGS. 4 and 5 are screenshots illustrating examples of an interface of a weekly image content viewer according to an embodiment of the present disclosure.
Figure 5:
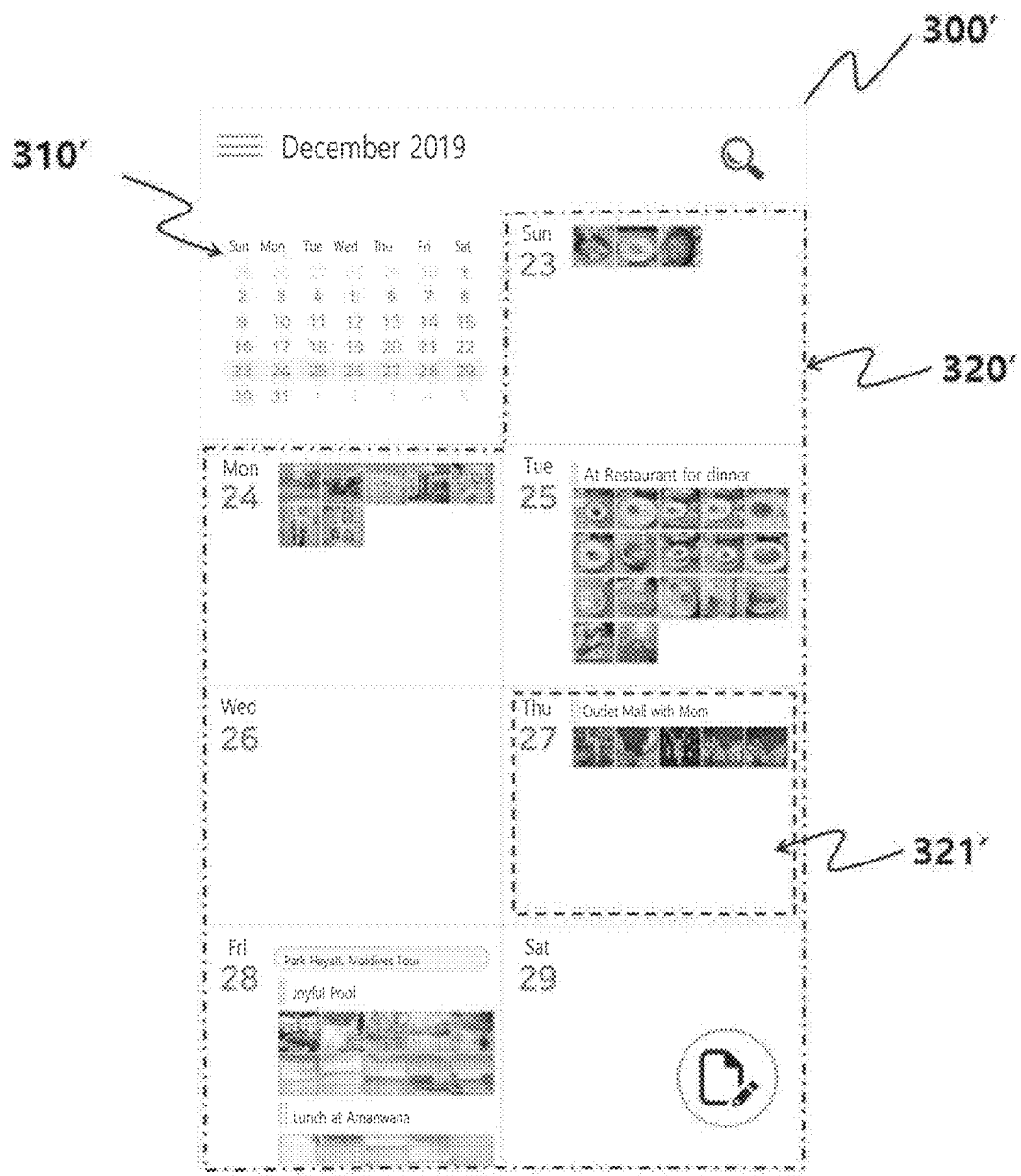
Figure 6:
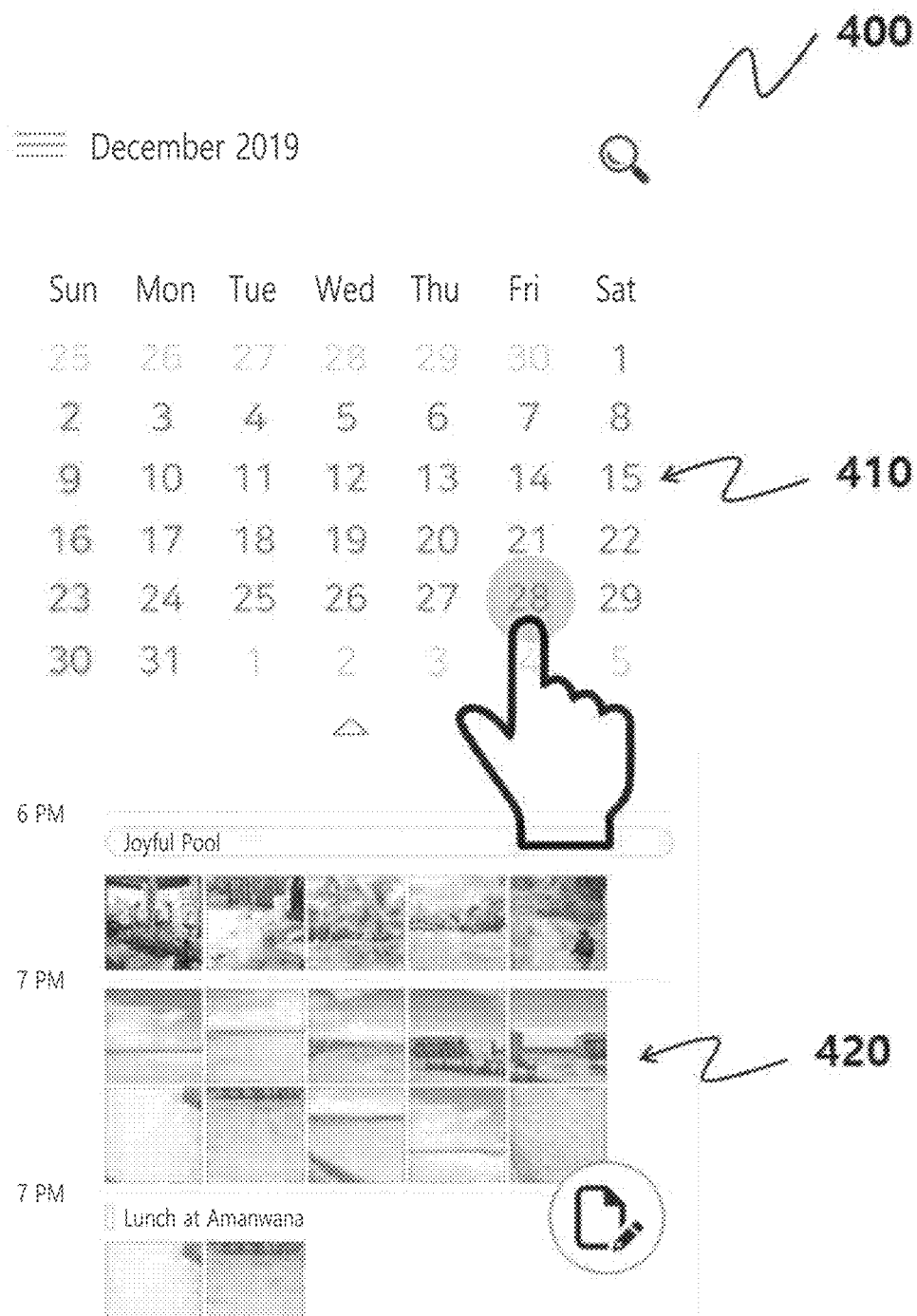
FIGS. 6 and 7 are screenshots illustrating examples of an interface of a monthly image content viewer according to an embodiment of the present disclosure.
Figure 7:
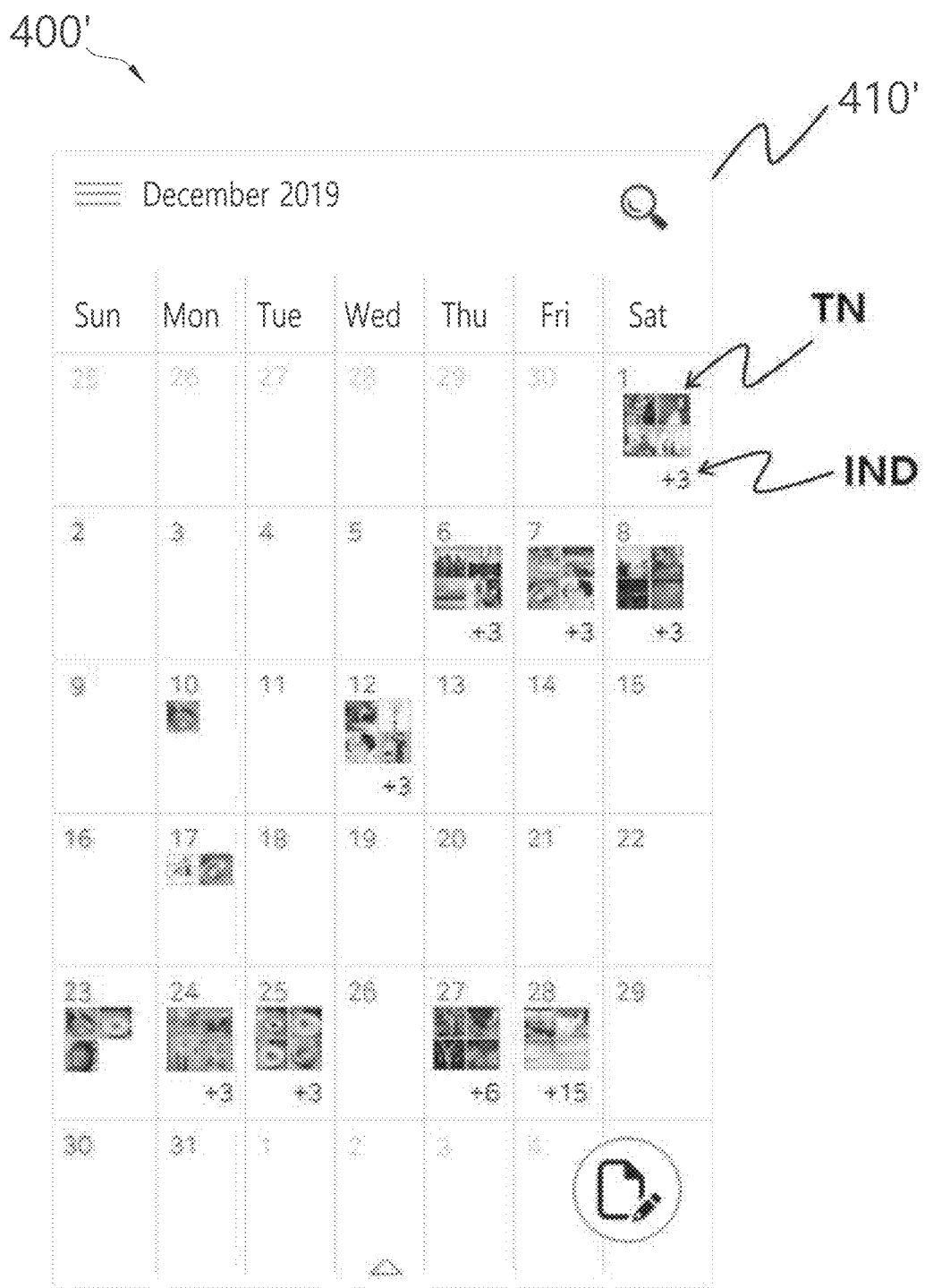

FIG. 3 shows an example of an interface of a daily image content viewer, FIG. 4 and FIG. 5 show examples of an interface of a weekly image content viewer, and FIGS. 6 and 7 show examples of an interface of a monthly image content viewer.

Referring to FIG. 3, an interface of a daily image content viewer 200 is configured to provide a plurality of daily image content display interface sections 210, 220, and 230 for displaying image contents by date. In the daily image content display interface sections 210, 220, 230, image contents obtained on the corresponding day or thumbnails thereof are displayed by time. That is, when the received interface switch user touch gesture is indicative of, or corresponds to, a request for switching to the daily image content viewer 200, the image content viewer controller 130 groups image contents having the same acquisition day based on acquisition time information included in the metadata of the image contents stored in the image content storage unit 120, generates the interface of the daily image content viewer 200 including the daily image content display interface sections 210, 220, 230 for displaying the grouped image contents having the same acquisition date, and provides the interface of the daily image content viewer through the display 140. Here, the "acquisition time" may mean time when the image content is acquired or when data of the image content is generated and may comprise year, month, date, hour, minute and second.

While the daily image content viewer interface 200 illustrated in FIG. 3 is configured to display image contents or their thumbnails acquired on a corresponding date on the daily image content display interface sections 210, 220, and 230 divided by acquisition dates, it may be configured differently. For example, the daily image content viewer interface 200 may be configured to display the image content folder generated for each acquisition date instead of images of the image contents or thumbnails. In this example, the user may select or touch the image content folder for each date to manage the image content acquired on the date. The management of image contents includes searching, deleting, sorting, copying, changing the display position (arrangement) or order of the image contents in a folder, moving to another folder, and the like, and may be performed according to a user input received through the interface of the period-specific image content viewer or an interface for managing a folder and/or files.

Meanwhile, the daily image content viewer interface 200 may be moved by date according to a user input. The user input for moving by date may be a left or right slide touch, a up or down slide touch, or any direction slide touch input by the user. For example, the image content viewer controller 130 may control the interface of the daily image content viewer 200 to move to the previous date when the user inputs a slide-left touch on the currently displayed interface of the daily image content viewer, and to move to the next date when the user inputs a slide-right touch on the currently displayed interface of the daily image content viewer. Alternatively, a vertical slide touch input by a user may move date. For example, the image content viewer controller 130 may control the interface of the daily image content viewer 200 to move to the previous date when the user inputs a slide-up touch on the currently displayed interface of the daily image content viewer, and to move to the next date when the user inputs a slide-down touch. The user inputs for moving by date are examples and may be variously modified.

Referring to FIG. 4, an interface of a weekly image content viewer 300 may be configured to provide a calendar display interface section 310 for displaying a weekly calendar and an image content display interface section 320 for displaying image contents. The calendar displayed on the calendar display interface section 310 displays dates constituting a week. When a specific date of the calendar display interface section 310 is touched or selected by a user, image contents or their thumbnails obtained on or corresponding to the touched date are displayed on the image content display interface section 320.

For instance, when the received interface switch user touch gesture is indicative of, or corresponds to, a request for switching to the weekly image content viewer 300, the image content viewer controller 130 groups image contents having the same acquisition week based on acquisition time information included in the metadata of the image contents stored in the image content storage unit 120, generates an interface for a weekly image content viewer 300 including the calendar display interface section 310 and the content display interface section 320 for displaying the grouped image contents having the same acquisition week, and provides the generated interface of the weekly image content viewer 300 through the display 140. When the user selects a specific date in the calendar display interface section 310 of the interface of the weekly image content viewer 300, the image content viewer controller 130 may display image contents or their thumbnails obtained on the selected date by time, similar to the daily image content viewer described above. The metadata of the acquired image can be technically widely used. For example, the metadata may be associated or used with other relevant services and can be provided for source of big data.

Meanwhile, the interface of the weekly image content viewer 300 may be moved by week according to a user input. The user input for moving by week may be a left or right slide touch, a up or down slide touch, or any direction slide touch input by a user. For example, the image content viewer controller 130 may control the weekly image content viewer interface 300 to move to the previous week when the user inputs a slide-left touch on the currently displayed weekly image content viewer interface, and to move to the next week when the user inputs a slide-right touch on the currently displayed weekly image content viewer interface. Alternatively, a user input for moving between different weeks may be a vertical slide touch input. For example, the image content viewer controller 130 may control the weekly image content viewer interface 300 to move to the previous week when the user inputs a slide-up touch on the currently displayed weekly image content viewer interface, and to move to the next week when the user inputs a slide-down touch on the currently displayed weekly image content viewer interface. The user inputs for moving by week are examples and may be variously modified.

FIG. 5 illustrates another example of weekly image content viewer interface 300' configured differently from the interface illustrated in FIG. 4. An interface of a weekly image content viewer 300' of FIG. 5 may include a calendar display interface section 310' and an image content display interface section 320' composed of a plurality of image content display blocks 321'. The dates consisting of the selected week are highlighted in the calendar display interface section 310' for identifying the selected week in the calendar. The image content display interface section 320' includes a plurality of image content blocks 321' provided or separated for each day of the week, and each image content block 321' displays thumbnails of image contents corresponding to, or acquired on, the corresponding date.

While the interfaces of the weekly image content viewer 300 and 300' shown in FIGS. 4 and 5 are configured to display the calendar display interface section 310 or 310' and the image content display interface section 320 or 320' providing image contents or their thumbnails corresponding to, or obtained on, a corresponding date, it may be configured differently. For example, the interface of the weekly image content viewer 300 or 300' may be configured to display an image content folder generated for each acquisition week. In this example, the user may manage the image contents acquired in the week by selecting or touching the weekly image content folder. The management of image contents includes searching, deleting, sorting, copying, changing the display position (arrangement) or order of the image contents in a folder, moving to another folder, and the like, and may be performed according to a user input received through the interface of the period-specific image content viewer or an interface for managing a folder and/or files.

Referring to FIG. 6, an interface of a monthly image content viewer 400 may be configured to provide a calendar display interface section 410 for displaying a monthly calendar and an image content display interface section 420 for displaying image contents by month. The calendar displayed on the calendar display interface section 410 displays dates constituting a month. When a specific date of the calendar display interface section 410 is touched or selected by a user, image contents or their thumbnails obtained on the touched date are displayed on the image content display interface section 420.

For instance, when the received interface switch user touch gesture is indicative of, or corresponds to, a request for switching to the monthly image content viewer 400, the image content viewer controller 130 groups image contents having the same acquisition month based on acquisition time information included in the metadata of the image contents stored in the image content storage unit 120, generates an interface for a monthly image content viewer 400 including the calendar display interface section 410 and the content display interface section 420 for displaying the grouped image contents having the same acquisition month, and provides the generated interface of the monthly image content viewer 400 through the display 140.

FIG. 7 illustrates another example of an interface of a monthly image content viewer 400' configured differently from the interface illustrated in FIG. 6. The monthly image content viewer interface 400' of FIG. 7 may not include an image content display interface section and include only a calendar display interface section. The calendar displayed on a calendar display interface section 410' displays one or more thumbnails TN representing image contents corresponding to, or acquired for, each date and an image content index IND indicating a number of pictures acquired for each date or indicating a number of pictures not displayed with the thumbnails in the calendar display interface section 410' because of a limited display space.

When the user selects or touches a specific date in the monthly image content viewer interface 400', the image content viewer controller 130 may display image contents or their thumbnails corresponding to, associated with, or obtained on, the selected date by time, similar to the interface of the daily image content viewer described above.

Meanwhile, the interface of the monthly image content viewer 400 or 400' may be moved by month according to a user input. The user input for moving by month may be a left or right slide touch, a up or down slide touch, or any direction slide touch input by a user. For example, the image content viewer controller 130 may control the monthly image content viewer interface 400 or 400' to move to the previous month when the user inputs a slide-left touch on the currently displayed monthly image content viewer interface, and to move to the next month when the user inputs a slide-right touch on the currently displayed monthly image content view interface. Alternatively, a user input for moving between different months may be a vertical slide touch input. For example, the image content viewer controller 130 may control the monthly image content viewer interface 400 or 400' to move to the previous month when the user inputs a slide-up touch on the currently displayed monthly image content viewer interface, and to move to the next month when the user inputs a slide-down touch on the currently displayed monthly image content view interface. The user inputs for moving by month are examples and may be variously modified.

While the monthly image content viewer interfaces 400 and 400' shown in FIGS. 6 and 7 are configured to display the calendar display interface section 410 or 410' and the image content display interface section 420 providing image contents or their thumbnails (TNs) corresponding to, or obtained on, a corresponding date, it may be configured differently. For example, the interface of the monthly image content viewer 400 or 400' may be configured to display an image content folder generated for each acquisition month. In this example, the user may manage the image content acquired in the month by selecting or touching the monthly image content folder. The management of image content includes searching, deleting, sorting, copying, changing the display position (arrangement) or order of the image contents in a folder, moving to another folder, and the like, and may be performed according to a user input received through the interface of the period-specific image content viewer or an interface for managing a folder and/or files.

Meanwhile, the interface of the monthly image content viewer 400 or 400' may be moved by month according to a user input. The user input for moving by month may be a left or right slide touch, a up or down slide touch, or any direction slide touch input by a user. For example, the image content viewer controller 130 may control the monthly image content viewer interface 400 or 400' to move to the previous month when the user inputs a slide-left touch on the currently displayed monthly image content viewer interface, and to move to the next month when the user inputs a slide-right touch on the currently displayed monthly image content view interface. Alternatively, a user input for moving between different months may be a vertical slide touch input. For example, the image content viewer controller 130 may control the monthly image content viewer interface 400 or 400' to move to the previous month when the user inputs a slide-up touch on the currently displayed monthly image content viewer interface, and to move to the next month when the user inputs a slide-down touch on the currently displayed monthly image content viewer interface. The user inputs for moving by month are examples and may be variously modified.

The image content viewer controller 130 may configured to provide the daily image content viewer interface 200, the weekly image content viewer interfaces 300 and 300' and the monthly image content viewer interfaces 400 and 400' in a step-by-step way according to or in response to the interface switching user touch gesture.

For example, the image content viewer controller 130 may be configured to detect a change in the touch interval of the interface switching user touch gesture to determine one of daily, weekly, and monthly as the grouping period, and provide one of the daily image content viewer interface 200, the weekly image content viewer interface 300, and the monthly image content viewer interface 400 according to the determined grouping period. The touch interval may be a distance between two points touched by a user on a display.

As the touch interval of the interface switching user touch gesture increases, the longer period may be determined as the grouping period. For example, the image content viewer controller 130 may be configured to switch the first image content viewer interface to the daily image content viewer interface 200 when the touch interval of the interface switching user touch gesture is equal to or greater than a first threshold interval which is predetermined or set by a manufacturer or the user, to switch to the weekly image content viewer interface 300 or 300' when the touch interval of the interface switching user touch gesture is greater than or equal to a second threshold interval which is greater than the first threshold interval and is predetermined or set by a manufacturer or the user, and to switch to the monthly image content viewer interface 400 or 400' when the touch interval of the interface switching user touch gesture is greater than or equal to a third threshold interval which is greater than the second threshold interval and is predetermined or set by a manufacturer or the user.

The above-described interface switching steps or performed by a controller or processor may be executed in succession. For example, when the touch interval of the interface switching user touch gesture on the first image content viewer interface is continuously changed from more than the first threshold interval to more than the second threshold interval, the first image content viewer interface is switched first to a daily image content viewer interface and then continuously switched to the weekly image content viewer interface 300 or 300'.

In the above-described examples, it is described that the grouping period is determined according to the magnitude of the change in the touch interval of the interface switching user touch gesture, but the determination of the grouping period may be performed in another manner. According to another example, the grouping period may be determined according to the number of inputs of the interface switch user touch gesture. For example, a current grouping period is switched to another one step longer grouping period if a user inputs a touch gesture increasing the touch interval once, and a current grouping period is switched to another two-step longer grouping period if the user inputs the same touch gesture twice. On the contrary, a current grouping period switches to another one step shorter grouping period if a user inputs a touch gesture decreasing the touch interval once, and a current grouping period is switched to another two-step shorter grouping period if the user inputs the same touch gesture twice.

Further, while the foregoing examples have been described that the switching of the grouping period is performed in a step-by-step way, it may be performed swiftly. For example, when the interface switch touch gesture is indicative of, or corresponds to, a request for switching from a daily interface to a monthly interface, according to the above-described embodiments, the switching of the interfaces may be performed from the daily interface to the monthly interface through a weekly interface, but in another embodiment, it may performed from the daily interface to the monthly interface directly. On the other hand, the switching of the interfaces may be performed cyclically. For example, when a period increasing gesture (e.g. increase of the touch interval between two touch points) is input to the monthly image content viewer interface, the image content viewer control unit 130 may switch the monthly image content viewer interface to the daily image content viewer interface that is a minimum grouping period since there is no period longer than monthly. On the other hand, when a period decreasing gesture (e.g. decrease of the touch interval between two touch points) is input to the daily image content viewer interface which is the minimum unit, the image content view controller 130 switches the daily image content view interface to the monthly image content viewer interface that is the maximum grouping period. Examples of dividing the grouping periods monthly, weekly and daily periods are described above, but the grouping period may be further divided or different groupings may be applied. For example, the grouping periods may include larger periods such as years, quarters, or the like, or shorter periods such as mornings, afternoons, and the like. In this case, the switching of the interface may be performed sequentially, swiftly or cyclically as described above.

The image content viewer controller 130 may be configured to suspend an operation or function of interface switching until the input of the interface switching user touch gesture is completed and determine the grouping period based on the touch interval between two or more touch points when the user's input is completed. For example, when the touch interval of the interface switching user touch gesture continuously changes on the first image content viewer interface from more than a first threshold interval to more than a second threshold interval, the image content viewer controller 130 may suspend an operation or function of switching the interfaces until completion of the interface switching user touch gesture is detected or the user's input is not detected, and switch the first image content viewer interface to the weekly image contents viewer interface, based on the touch interval at or after the completion of the user's input, when the completion of the interface switching user touch gesture input is detected or the user's input is not detected. The completion of the interface switching user touch gesture input is detected when at least one of the two touch inputs is released on the image content viewer interface. As such, the image content viewer control unit 130 may be configured to switch the image content viewer interface after detecting the completion of the input of the touch gesture, thereby the interface may be switched to a final grouping period skipping the intermediate grouping period omitting even when interface switching is hopped by two or more grouping periods.

The image content viewer controller 130 may be configured to switch one of the daily image content viewer interface 200, the weekly image content viewer interface 300, and the monthly image content viewer interface 400 to another according to an interface switching user touch gesture.

In detail, the image content viewer controller 130 may be configured to determine the increase or decrease of the grouping period based on the direction of the change of the touch interval of the interface switching user touch gesture, and switch one of the daily image content viewer interface 20, weekly image content viewer interface 3), and monthly image content viewer interface 400 to another according to the determined grouping period increase or decrease. It is obvious that the above-described touch gestures may be used as the touch gestures for switching the period-specific image content viewer interface and may be set in various ways. Since various examples of touch gestures for mutual switching of the image content viewer interface have been described above, a description thereof will be skipped.

Figure 8:
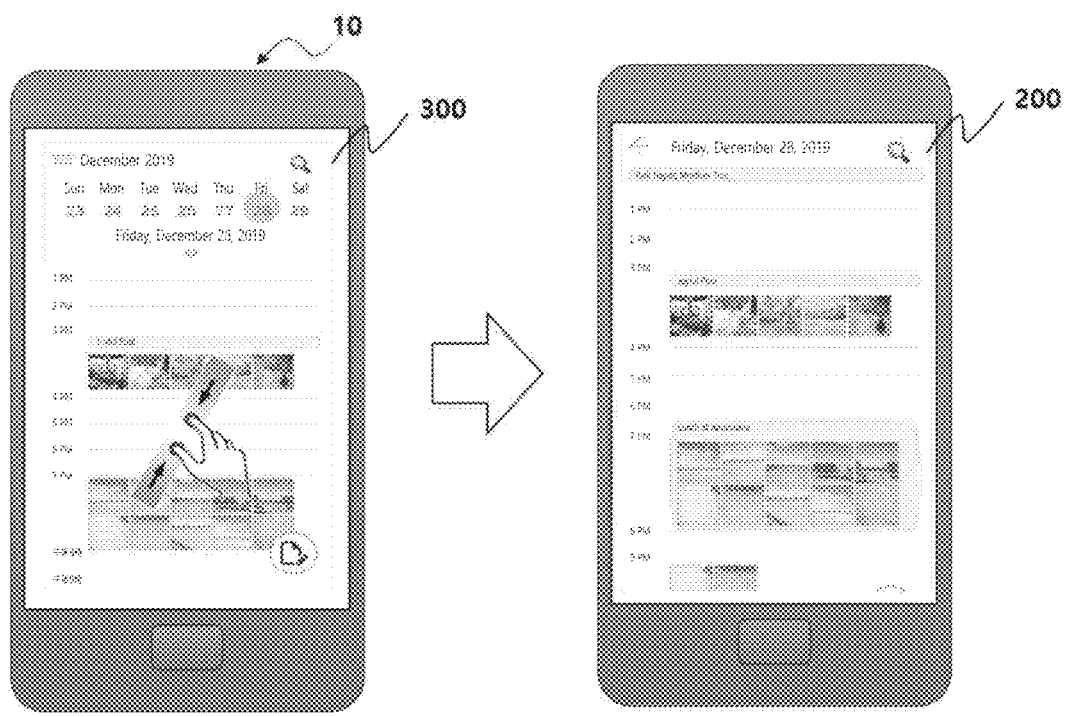
FIGS. 8 and 9 illustrate examples showing operations of switching from one of period-specific image content viewer interfaces to another interface according to an embodiment of the present disclosure.
Figure 9:
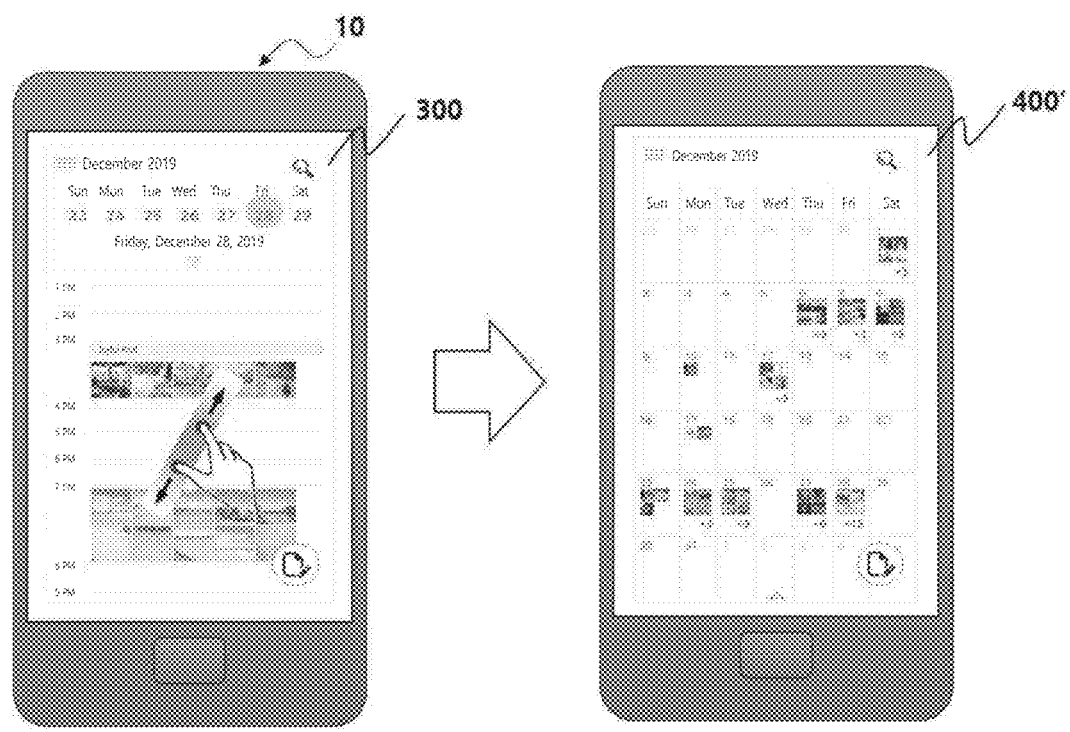

FIGS. 8 and 9 illustrate examples in which one of period-specific image content viewer interfaces are switched to another.

In the examples of FIGS. 8 and 9, the period-specific image content viewer interface currently displayed on the display 140 is a weekly image content interface.

Referring to FIG. 8, when an interface change user touch gesture is input on the weekly image contents viewer interface 300, the image content viewer controller 130 detects a direction of change in the touch interval of the interface change user touch gesture. For example, when the user touches two points on the image content viewer interface and reduces the touch interval, the image content viewer controller 130 changes the grouping period to a day shorter than a week, which is the current grouping period, then switches the weekly image content viewer interface, which is currently provided on the display 140, to the daily image contents viewer interface 200 corresponding to the changed grouping period.

Referring to FIG. 9, when an interface change user touch gesture is input on the weekly image content interface 300, the image content viewer controller 130 detects a direction of change of a touch interval of the interface change user touch gesture. For example, if the user increases the touch interval while touching two points on the image content viewer interface as shown in FIG. 9, the image content viewer controller 130 changes the grouping period to a month longer than a week, which is the current grouping period, then switches the weekly image content viewer interface, which is currently provided on the display 140, to the monthly image contents viewer interface 400 corresponding to the changed grouping period.

It is obvious that the touch gestures for switching the period-specific image content viewer interface may be set in various ways and used instead of the above-described touch gestures. Since various examples of touch gestures for mutual switching of the image content viewer interface have been described above, a description thereof will be skipped.

The image content viewer controller 130 may include a hardware, software, or combinations of hardware and software configured to provide a first image content viewer interface, determine a grouping period based on an interface switch user touch gesture, and generate a period-specific image content interface according to the determined grouping period. For example, the image content viewer controller 130 may comprise software including commands for providing a first image content viewer interface, determining a grouping period from an interface switching user touch gesture, and generating an image content interface for each period according to the determined grouping period, and a processor of mobile communication device 10 performing processes according to the commands. In this case, the software constituting the image content viewer controller 130 may be installed in the mobile communication terminal 10 in a form of an application.

Various period-specific image content view interfaces can be efficiently switched by an user's touch input without including a graphical user interface for sort, such as a button, in the period-specific image content viewer interface, and therefore the graphic configuration of the period-specific image content viewer interface may be simplified, necessary system resource may be reduced and operation efficiency may be increased.

Hereinafter, a method of providing an image content viewer interface performed by the aforementioned mobile communication terminal will be described with reference to FIG. 10.

Figure 10:
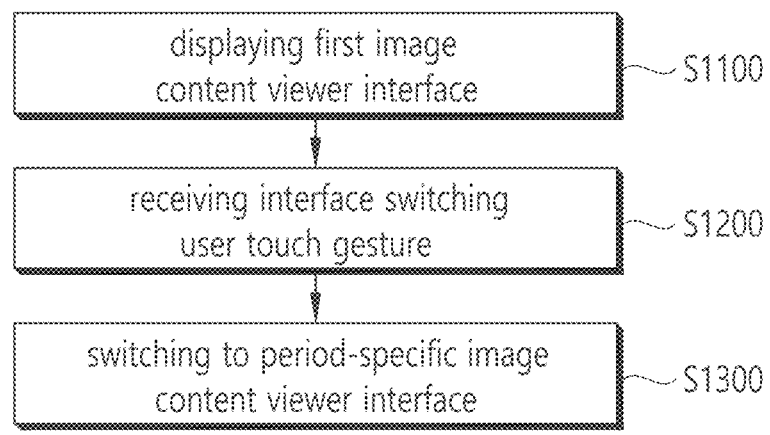
FIG. 10 is a flowchart illustrating a method of providing an image content viewer interface according to an embodiment of the present disclosure.

FIG. 10 is a flowchart illustrating a method of providing an image content viewer interface according to an embodiment of the present disclosure.

First, the image content viewer controller 130 of the mobile communication terminal 10 generates and outputs or displays a first image content viewer interface listing image contents or their thumbnails according to an acquisition time (S1100).

Then, the image content viewer controller 130 receives an interface switch user touch gesture input from a user on the first image content viewer interface (S1200).

In response to the interface switching user touch gesture, the image content viewer controller 130 switches the first image content viewer interface to a period-specific image content viewer interface in which the plurality of image contents are grouped and provided according to a grouping period (S1300).

As described above, the period-specific image content viewer interface may be provided for each grouping period having a different length such as daily, weekly, or monthly, according to the received interface switch user touch gesture. Various period-specific image content view interfaces can be efficiently switched by an user's touch input without including a graphical user interface for sort, such as a button, in the image content viewer interface, and therefore the graphic configuration of the image content viewer interface may be simplified, necessary system resource may be reduced and operation efficiency may be increased.

Figure 11:
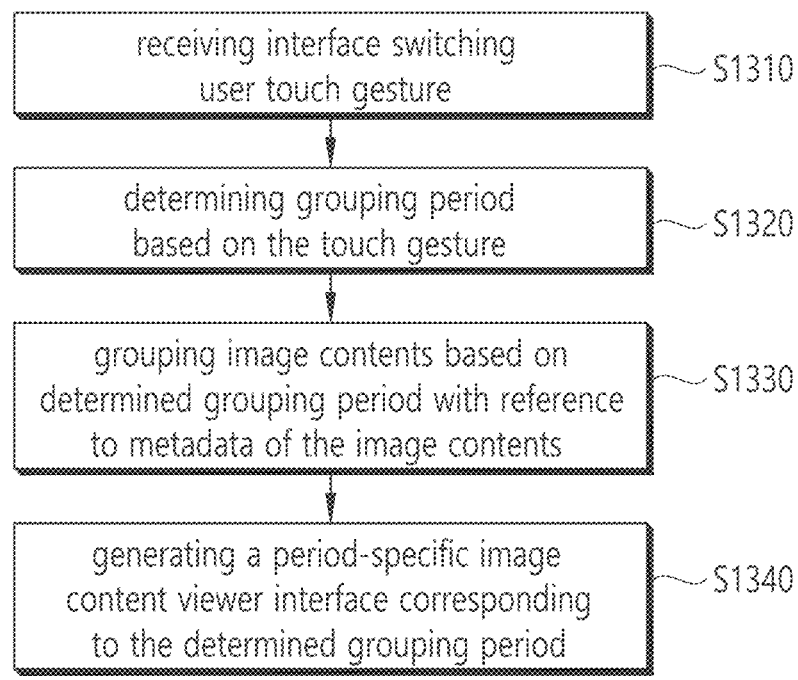
FIG. 11 is a flowchart illustrating a process of providing a period-specific image content viewer interface according to a user's input for switching interface according to an embodiment of the present disclosure.

FIG. 11 is a flowchart illustrating a process of providing a period-specific image content viewer interface according to a interface switching user touch gesture received from a user.

First, the touch panel of the display unit 140 of the mobile communication terminal 10 receives an interface switching user touch gesture and outputs a signal associated with the interface switching user touch gesture to the image content viewer controller 130.

The image content viewer controller 130 receives the signal associated with the interface switching user touch gesture (S1310). At the step S1310, the image content viewer controller 130 may receive a change in the touch gesture (e.g. change in the touch interval between two or more touch points input by the user), receive a change in the touch gesture and release of the touch, or receive an input number of the touch gesture.

Then, the image content viewer controller 130 determines the grouping period according to the detected touch gesture (S1320). That is, the image content viewer controller 130 is configured to determine the grouping period to be switched according to the change in the input touch gesture (e.g. change in the touch interval between two or more touch points input by the user), the touch release, or the number of inputs of the touch gesture. At the step S1320, the method of determining the grouping period according to the input of the touch gesture by the image content viewer controller 130 has been described in the embodiments of the image content switching touch gesture.

The image content viewer controller 130 groups the plurality of image contents based on the determined grouping period and/or the acquisition time included in the metadata of the plurality of image contents (S1330). The metadata of the acquired image can be technically widely used. For example, the metadata may be associated or used with other relevant services and can be provided for source of big data.

Finally, the image content viewer controller 130 generates the period-specific image content viewer interface listing the image contents grouped according to the grouping period and outputs or displays the same through the display unit 140 (S1340).

Each processing step of FIGS. 10 and 11 has been described in detail with reference to FIGS. 1 to 9 while describing an operation of the image content viewer controller 130, so a detailed description thereof will be skipped.

According to some embodiments of the present disclosure, period-specific image content viewer interfaces can be efficiently switched by an user's touch input without including a graphical user interface for sort, such as a button, in the period-specific image content viewer interface, and therefore the graphic configuration of the period-specific image content viewer interface may be simplified, necessary system resource may be reduced and operation efficiency may be increased. The metadata of the acquired image can be technically widely used. For example, the metadata may be associated or used with other relevant services and can be provided for source of big data.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A computerized method for managing image contents, which is performed by a controller included in a mobile communication terminal, the method comprising:
    outputting, on a display of the mobile communication terminal, a first interface of an image content viewer listing thumbnails of a plurality of image contents in order of time associated with each of the image contents;
    detecting one or more user inputs associated with the first interface of the image content viewer; and
    switching, by the controller of the mobile communication terminal, an interface displayed on the display of the mobile communication terminal from the first interface of the image content viewer to one of interfaces of period-specific image content viewers in response to the detected one or more user inputs, wherein each of the interfaces of the period-specific image content viewers displays groups of the thumbnails and/or information of the image contents which are grouped by a different time period from each other of the interfaces of the period-specific image content viewers,
    wherein the one or more user inputs comprise a change to a touch distance between two points touched by a user on the interface displayed on the display of the mobile communication terminal for switching between the interfaces of the period-specific image content viewers, and
    the controller switches from the first interface of the image content viewer to a second interface grouping the image contents according to a longer time period than the first interface of the image content viewer among the interfaces of the period-specific image content viewers when the detected touch distance is increased, or switches from the first interface of the image content viewer to a third interface grouping the image contents according to a shorter time period than the first interface of the image content viewer among the interfaces of the period-specific image content viewers when the detected touch distance is decreased.

2. The computerized method of claim 1, wherein the switching of the interface displayed on the display of the mobile communication terminal comprises:

detecting the change to the touch distance between two points touched by the user on the interface displayed on the display of the mobile communication terminal for switching between the interfaces of the period-specific image content viewers;

selecting one of the interfaces of the period-specific image content viewers according to the detected touch distance;

grouping the plurality of image contents according to a time period corresponding to the selected one of the interfaces of the period-specific image content viewers, wherein the time associated with each of the image contents is included in metadata of each of the image contents; and providing the selected one of the interfaces of the period-specific image content viewers displaying the thumbnails and/or information of the grouped image contents according to the time period corresponding to the selected one of the interfaces of the period-specific image content viewers.

3. The computerized method of claim 2, wherein the controller suspends performing the switching of the interface displayed on the display of the mobile communication terminal during the change to the touch distance between two points touched by the user on the interface until the one or more user inputs are completed, and determines which one of the interfaces of the period-specific image content viewers corresponds to the detected touch distance between the two points touched by the user after the one or more user inputs are completed.

4. The computerized method of claim 1, wherein the interfaces of the period-specific image content viewers comprise an interface of a daily image content viewer grouping the plurality of the image contents by day, an interface of a weekly image content viewer grouping the plurality of the image content viewer by week, and an interface of a monthly image content viewer grouping the plurality of the image content viewer by month.

5. The computerized method of claim 4, wherein the interfaces of the weekly image content viewer and the monthly image content viewer include a calendar display interface section displaying a calendar and an image content display interface section displaying the thumbnails and/or information of the image contents.

6. The computerized method of claim 1, further comprising comparing the change to the touch distance between two points touched by the user with a plurality of predetermined or set threshold intervals corresponding to the interfaces of the period-specific image content viewers, respectively, wherein the controller selects one of the interfaces of the period-specific image content viewers, to which the interface displayed on the display of the mobile communication terminal is to be switched, based on comparison result between the change to the touch distance between two points touched by the user and the plurality of predetermined or set threshold intervals corresponding to the interfaces of the period-specific image content viewers, respectively.

7. A computerized method for managing image contents, which is performed by a controller included in a mobile communication terminal, the method comprising:

outputting, on a display of the mobile communication terminal, a first interface of an image content viewer listing thumbnails of a plurality of image contents in order of time associated with each of the image contents;

detecting; one or more user inputs associated with the first interface of the image content viewer; and switching, by the controller of the mobile communication terminal, an interface displayed on the display of the mobile communication terminal from the first interface of the image content viewer to one of interfaces of period-specific image content viewers in response to the detected one or more user inputs, wherein each of the interfaces of the period-specific image content viewers displays groups of the thumbnails and/or information of the image contents which are grouped by a different time period from each other of the interfaces of the period-specific image content viewers, wherein the switching of the interface displayed on the display of the mobile communication terminal includes:

counting a number of the one or more user inputs;

selecting one of the interfaces of the period-specific image content viewers according to the detected number of the one or more user inputs;

grouping the plurality of image contents according to a time period corresponding to the selected one of the interfaces of the period-specific image content viewers, wherein the time associated with each of the image contents is included in metadata of each of the plurality of image contents; and providing the selected one of the interfaces of the period-specific image content viewers displaying the thumbnails and/or information of the grouped image contents according to the time period corresponding to the selected one of the interfaces of the period-specific image content viewers.

8. A mobile communication terminal comprising:

an image content storage configured to store a plurality of image contents;

a display device including a touch panel configured to detect one or more user inputs, the display device configured to display the image contents; and a controller configured to:

output, on the display device, a first interface of an image content viewer listing thumbnails of the plurality of image contents in order of time associated with each of the image contents;

receive a signal associated with the detected one or more user inputs associated with the first image content viewer interface; and switch an interface displayed on the display device from the first interface of the image content viewer to one of interfaces of period-specific image content viewers in response to the detected one or more user inputs, wherein each of the interfaces of the period-specific image content viewers displays groups of the thumbnails and/or information of the image contents which are grouped by a different time period from each other of the interfaces of the period-specific image content viewers, wherein the one or more user inputs comprise a change to a touch distance between two points touched by an user on the interface displayed on the display device for switching between the interfaces of the period-specific image content viewers, and the controller is configured to switch from the first interface of the image content viewer to a second interface grouping the image contents according to a longer time period than the first interface of the image content viewer among the interfaces of the period-specific image content viewers when the detected touch distance is increased, or to switch from the first interface of the image content viewer to a third interface grouping the image contents according to a shorter time period than the first interface of the image content viewer among the interfaces of the period-specific image content viewers when the detected touch distance is decreased.

9. The mobile communication terminal of claim 8, wherein the controller is further configured to:
   detect the change to the touch distance between two points touched by the user on the interface displayed on the display device for switching between the interfaces of the period-specific image content viewers;
   select one of the interfaces of the period-specific image content viewers according to the detected touch distance;
   group the plurality of image contents according to a time period corresponding to the selected one of the interfaces of the period-specific image content viewers, wherein the time associated with each of the image contents is included in metadata of each of the image contents; and
   provide the selected one of the interfaces of the period-specific image content viewers displaying the thumbnails and/or information of the grouped image contents according to the time period corresponding to the selected one of the interfaces of the period-specific image content viewers.

10. The mobile communication terminal of claim 9, wherein the controller is configured to:
    suspend performing the switching of the interface displayed on the display device during the change to the touch distance between two points touched by the user on the interface until the one or more user inputs are completed, and
    determine which one of the interfaces of the period-specific image content viewers corresponds to the detected touch distance between the two points touched by the user after the one or more user inputs are completed.

11. The mobile communication terminal of claim 8, wherein the controller is further configured to:
    count a number of the one or more user inputs;
    select one of the interfaces of the period-specific image content viewers according to the detected number of the one or more user inputs;
    group the plurality of image contents according to a time period corresponding to the selected one of the interfaces of the period-specific image content viewers, wherein the time associated with each of the image contents is included in metadata of each of the plurality of image contents; and
    provide the selected one of the interfaces of the period-specific image content viewers displaying the thumbnails and/or information of the grouped image contents according to the time period corresponding to the selected one of the interfaces of the period-specific image content viewers.

12. The mobile communication terminal of claim 8, wherein the interfaces of the period-specific image content viewers comprise an interface of a daily image content viewer grouping the plurality of the image contents by day, an interface of a weekly image content viewer grouping the plurality of the image content viewer by week, and an interface of a monthly image content viewer grouping the plurality of the image content viewer by month.

13. The mobile communication terminal of claim 12, wherein the interfaces of the weekly image content viewer and the monthly image content viewer include a calendar display interface section displaying a calendar and an image content display interface section displaying the thumbnails and/or information of the image contents.

14. The mobile communication terminal of claim 8, wherein the controller is configured to:
    compare the change to the touch distance between two points touched by the user with a plurality of predetermined or set threshold intervals corresponding to the interfaces of the period-specific image content viewers, respectively, and
    select one of the interfaces of the period-specific image content viewers, to which the interface displayed on the display of the mobile communication terminal is to be switched, based on comparison result between the change to the touch distance between two points touched by the user and the plurality of predetermined or set threshold intervals corresponding to the interfaces of the period-specific image content viewers, respectively.

* * * * *